United States Patent [19]

Polletta et al.

[11] Patent Number: 5,237,981
[45] Date of Patent: Aug. 24, 1993

[54] FUEL INJECTION APPARATUS FOR VEHICLES

[75] Inventors: David F. Polletta, Northville; David F. Bjerke, Birmingham; William S. Miller, Wixon; Steven G. Todd, Sterling Heights, all of Mich.

[73] Assignee: PAS, Inc., Troy, Mich.

[21] Appl. No.: 839,959

[22] Filed: Feb. 21, 1992

[51] Int. Cl.$^5$ .................. F02M 21/04; F02B 43/00
[52] U.S. Cl. ................................. 123/527; 220/686
[58] Field of Search ............... 123/527; 220/901, 686; 62/50.3, 53.2

[56] References Cited

U.S. PATENT DOCUMENTS

| 525,459 | 9/1894 | Hill | 220/686 |
|---|---|---|---|
| 4,430,978 | 2/1984 | Lewis et al. | 123/527 |
| 4,523,548 | 6/1985 | Engel et al. | 123/527 |
| 4,545,345 | 10/1985 | Pagdin et al. | 123/527 |
| 4,843,558 | 6/1989 | Bergmann et al. | 123/527 |
| 5,025,758 | 6/1991 | Djurdjevic | 123/527 |
| 5,033,444 | 7/1991 | Kaufman et al. | 123/527 |
| 5,076,244 | 12/1991 | Donaldson | 123/527 |

FOREIGN PATENT DOCUMENTS

| 0005407 | 1/1980 | Japan | 123/527 |
|---|---|---|---|
| 0252860 | 11/1986 | Japan | 123/527 |
| 0259275 | 10/1990 | Japan | 123/527 |

Primary Examiner—Willis R. Wolfe
Assistant Examiner—Erick Solis
Attorney, Agent, or Firm—Basile and Hanlon

[57] ABSTRACT

A fuel injection apparatus for a vehicle includes a throttle body having an air flow passage extending therethrough with a throttle plate mounted in the passage. At least one fuel injector is mounted below the throttle plate and above the intake manifold of the engine for cyclically injecting fuel into the air flow passage extending between the throttle body and the inlet of the intake manifold. A full time, closed loop feedback control system monitors exhaust gas content and adjusts the fuel flow based on the measured air/fuel ratio. A tank storing gaseous fuel at a high pressure is connected to the fuel injector via fluid flow conduits. An annular recess is formed on at least one location on the side wall of the tank. Annular shoulders are disposed on opposite sides of the recess and extend outward above the side wall of the tank. A mounting bracket is mounted in the recess surrounding the tank and is attachable to the vehicle to mount the tank to the vehicle. A fuel fill door sensor closes the fuel delivery path during refueling.

14 Claims, 7 Drawing Sheets

FUEL INJECTION APPARATUS FOR VEHICLES

BACKGROUND OF THE INVENTION

1. Field of the Invention

The present invention relates, in general, to gaseous fuel injection systems for motor vehicles.

2. State of the Art

Over the past several years, the automotive industry has shifted from the use of carburetors to electronic fuel injection to improve emissions and drivability in gasoline powered vehicles. These gasoline powered fuel injection systems are of two basic types: throttle body injection and port injection. In a throttle body fuel injection system, one or more injectors are mounted above the throttle plates attached to the intake manifold of the engine. Fuel is injected by the injectors at precise rates and mixed with air in the throttle body and intake manifold to provide the desired air/fuel ratio for all cylinders. In a port injection system, an injector is mounted at each cylinder port and injects fuel directly into the cylinder port where it is mixed with air to form the desired air/fuel mixture.

Currently, there is new interest in using alternate fuels to meet governmental emission requirements and fuel economy standards and to reduce dependence on foreign oil. Alternate fuels being investigated for potential use in automotive vehicles are natural gas and liquid petroleum gas which can be stored in tanks mounted on the vehicle. Heretofore, such gaseous powered vehicles use a gas supply ring to supply gas just above a disabled conventional gasoline carburetor or employ a special gaseous fuel carburetor. Injection of gaseous fuel into the vehicle engine ports or via throttle body injection has also been proposed. The injection of gaseous fuel into a throttle body at the cylinder port is sensitive to variations in manifold pressure, gas temperature and gas pressure caused by engine operating and environmental conditions. Such variations require extensive control techniques in order to maintain the desired quantity of injected fuel over the wide range of engine operating conditions.

One unique approach to overcome variations in fuel flow due to variations in manifold pressure is to inject gaseous fuel at sonic flow rates. In this way, the amount of fuel injected is proportional to injection valve open time and is independent of manifold pressure. However, this approach generates unacceptable high noise levels since the injectors are mounted above the throttle body and are surrounded only by the air cleaner. Thus, it would be desirable to provide a gaseous fuel injection system which provides sonic flow rate injection of the fuel at acceptable low noise levels.

Another problem encountered in the use of gaseous fuels in vehicle engines is the dependency of fuel flow rates on gas temperature and pressure. Prior art gaseous fuel engines utilize a number of sensors and other control devices to monitor the gas temperature and pressure, to maintain the gas temperature and pressure at desirable levels and to control air/fuel ratios based on variations in gas temperature and pressure. Such sensors and additional control devices add to the cost of the gaseous fuel system and make control of the quantity of injected gaseous fuel into the engine much more difficult. Thus, it would be desirable to provide a gaseous fuel system which eliminates the need for gas temperature and gas pressure sensors and other control devices.

Finally, the use of gaseous fuels in automotive vehicles creates problems in the placement of the tanks used to store the gases under high pressure. The high tank pressure required allows little flexibility in storage tank shape. Heretofore, such tanks have been placed in the bed of a pickup truck or inside the passenger compartment of a van. This consumes needed cargo and passenger space and necessarily limits the number of tanks which can be conveniently mounted on a vehicle. It is usually desirable to provide multiple tanks on a single vehicle to provide an adequate operating range between fill-ups. Thus, it would be desirable to provide a unique gaseous fuel tank mounting arrangement which enables multiple tanks to be conveniently and safely mounted on a vehicle without consuming needed cargo or passenger space.

SUMMARY OF THE INVENTION

The present invention is a fuel injection apparatus for injecting a gaseous fuel into the intake manifold of an engine.

In one embodiment, the fuel injection apparatus includes a movable throttle plate which is mounted in the engine air flow passage to vary the quantity of air flow through the engine air intake passage in response to throttle plate position and engine speed. A cyclicly operable fuel injector means is provided to inject pulses of fuel into the air passage extending from the throttle plate to an air intake manifold on an engine. Means are provided for mounting the fuel injection means between the throttle plate and the air intake manifold of an engine in fluid flow communication with the air flow passage extending between the throttle plate and the intake manifold.

In one embodiment, the mounting means comprises an adapter plate or other suitable attachment mounted below the throttle plate and to the intake manifold of the engine. The adapter plate or other attachment has at least one bore formed therein coaxially aligned with the air flow passage extending between the throttle plate and the inlet of the intake manifold The fuel injector means is mounted in the adapter plate and disposed in fluid communication with the bore in the adapter plate to inject fuel into the bore in response to control signals generated by a controller.

The gas pressure differential at the fuel injector is designed to create a sonic flow of fuel injected through the adapter plate or other manifold mounting arrangement into the intake manifold. The mounting position of the adapter plate below the throttle plate and above the intake manifold significantly reduces noise levels generated by such sonic fuel flow.

In another embodiment, the fuel injector apparatus of the present invention is designed for injecting gaseous fuel into the intake manifold of an engine. In this embodiment, tank means in the form of at least one and, possibly, a plurality of tanks are mounted on the vehicle. Each tank is capable of storing gaseous fuel at a high pressure. At least one and preferably two spaced annular recesses are formed in the side wall of each tank. A pair of raised shoulders are formed on opposite sides of each recess and extend outward above the side wall of each tank. Mounting bracket means are disposed in each recess and are attachable to frame members of the vehicle for mounting the tanks to the vehicle, preferably below the cargo or passenger compartment of the vehicle.

A fuel fill valve is mounted at an accessible position on the vehicle and is connected by fluid conduits to electrically controllable valves mounted on each tank. A fuel fill door also mounted on the vehicle is pivotal from a first position covering the fuel fill valve to a second position exposing the fuel fill valve to access. A switch detects movement of the fuel fill door from the first position. The switch is connected as an input to the control means which automatically closes a shut-off valve mounted between the outlet of each fuel tank and the fuel injector(s) to prevent the supply of fuel to the fuel injection means when the fuel fill door is open during refueling.

In another embodiment, the fuel injector apparatus of the present invention is designed as a full time, closed loop feedback fuel system. In this embodiment, the engine air/fuel ratio is monitored continuously by means of an oxygen sensor located in the exhaust gas pipe of the engine. The control means varies the injector "on" time based on the measured air/fuel ratio and corrects the injector "on" time on a continuous, full time basis despite any change in engine operating conditions, ambient conditions, fuel composition, etc. Changes in the gaseous fuel composition, temperature and pressure due to atmospheric ambient changes normally create errors in the engine air/fuel ratio. The full time, closed loop feedback fuel system of the present invention eliminates the extensive and costly measures required in previously devised fuel injection systems which utilize temperature and pressure sensors and control electronics to correct for variations in gas flow caused by changes in gas pressure and temperature due to ambient conditions and, also, for changes in fuel composition.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
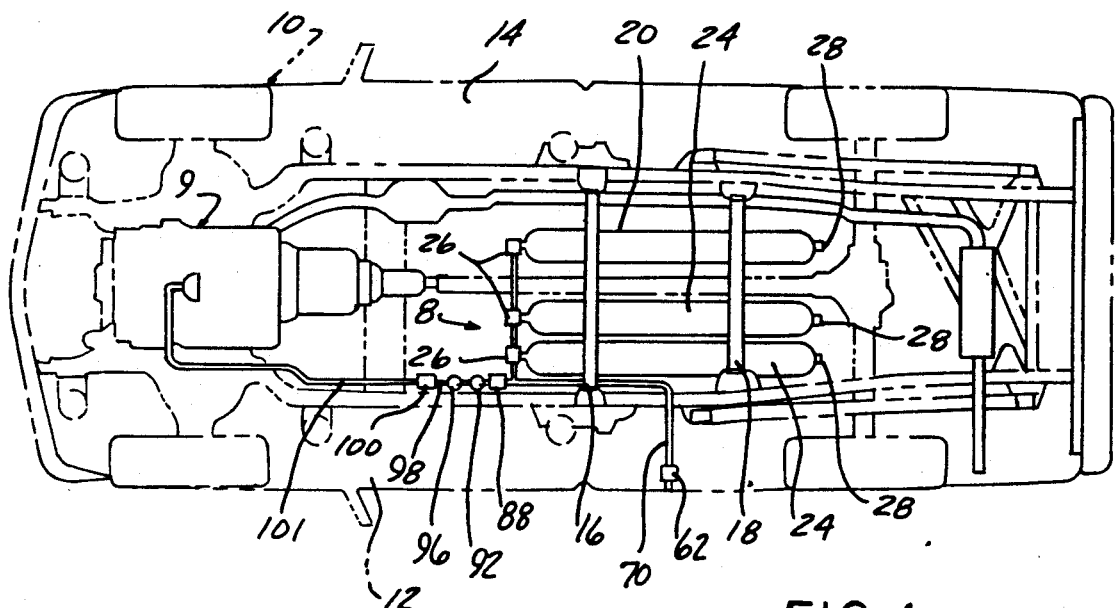
FIG. 1 is a perspective view of a fuel injection apparatus mounted on a vehicle.

Referring now to the drawing, and to FIG. 1 in particular, there is illustrated a fuel injection apparatus 8 for supplying a gaseous fuel to an engine 9 of an automotive vehicle. It will be understood that the vehicle 10 may be any type of automotive vehicle, such as an automobile, truck, van, etc., even though a pickup truck is described hereafter by way of example only.

The pickup truck 10 has an engine 9 and a rear bed, not shown, both mounted on a frame structure. By way of example only, and not forming a part of the present invention, the frame structure of the vehicle 10 includes a pair of spaced side rails 12 and 14 which are interconnected into a rigid structure by a plurality of cross members, such as cross members 16 and 18 as shown in FIGS. 1, 2 and 4.

At least one and possibly a plurality of high pressure, fuel storage tanks 20, 22 and 24 are mounted below the bed of the pickup truck 10 and attached to the spaced cross members 16 and 18 by a mounting means described hereafter. Each of the tanks 20, 22 and 24 may be formed of any suitable tank capable of storing gaseous fuel, such as natural gas or liquid petroleum gas, under high pressures. Such tanks 20, 22 and 24 have an elongated, generally cylindrical shape and are provided with an electrically controlled solenoid valve 26 mounted at a first end which controls the discharge of fuel from each of the tanks 20, 22 and 24. The solenoid valve 26 may be any suitable valve, such as a Series 500 CNG solenoid valve manufactured by Mirada Research & Mfg., for example.

A safety relief valve 28 which provides overtemperature and overpressure protection is mounted in a second, opposed end of each of the tanks 20, 22 and 24. A suitable safety relief valve 28 is a Series 5000 CNG safety relief device manufactured by Mirada Research & Mfg., for example.

Figure 2:
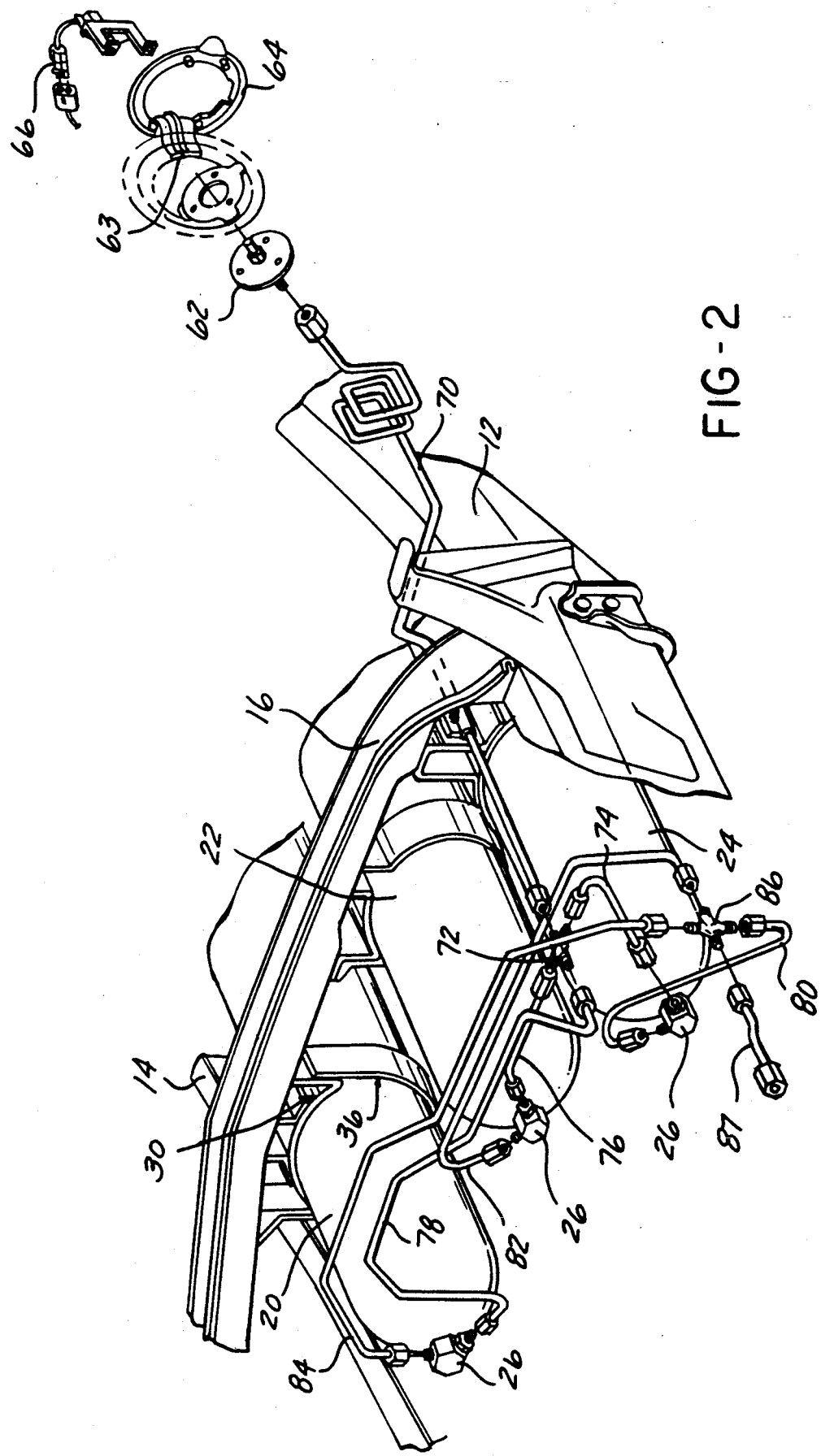
FIG. 2 is a perspective view showing the fuel fill and deliver conduits associated with the fuel storage tanks of the present apparatus.
Figure 4:
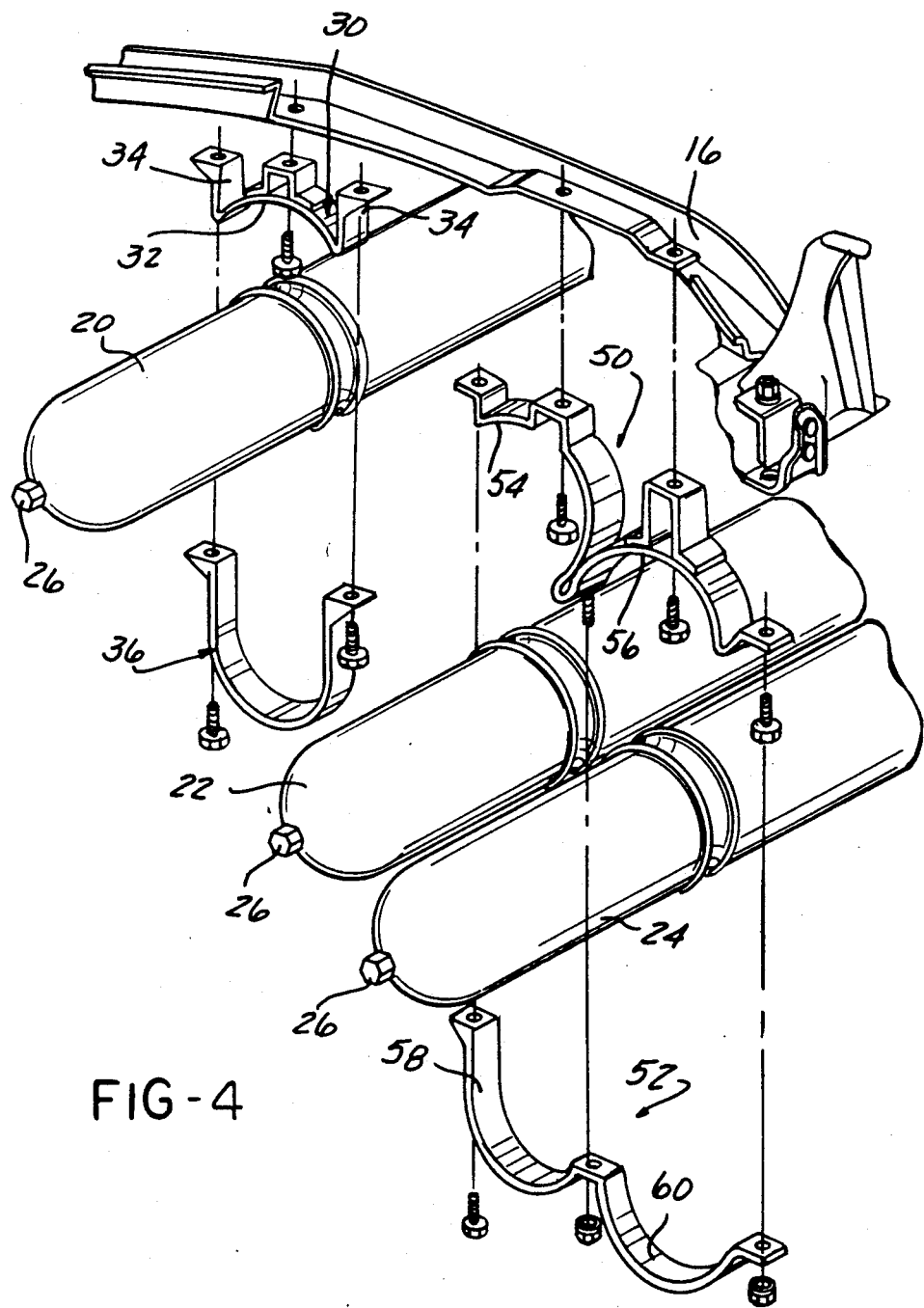
FIG. 4 is a partial, exploded, perspective view showing the mounting means used to mount multiple fuel storage tanks on the vehicle shown in FIG. 1.

The fuel storage tanks 20, 22 and 24 are attached to the cross members 16 and 18 by a mounting means as shown in FIGS. 2 and 4. The mounting means is provided for at least one portion of each of the tanks 20, 22 and 24 and, preferably, at two spaced locations on the tanks 20, 22 and 24. The mounting means comprises, in a preferred embodiment, a front mounting bracket assembly including an upper mounting member 30 having a generally semicircular central portion 32 extending between two mounting legs 34. A corresponding U-shaped lower mounting bracket 36 is provided for attachment to the mounting legs 34 of the upper bracket 30. The upper and lower brackets 30 and 36 form a generally circular opening therebetween for secure engagement about a portion of the tank 20.

Figure 3:
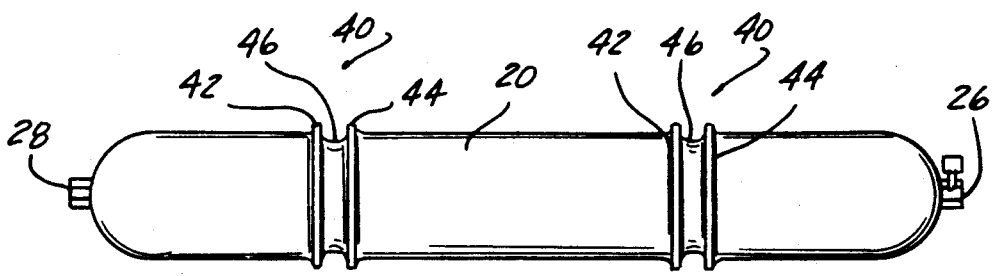
FIG. 3 is an enlarged side elevational view of one of the fuel storage tanks employed in the fuel injection apparatus shown in FIG. 1.

As shown in FIG. 3, each of the tanks, such as tank 20, is provided with one and preferably two spaced, recessed annular rings denoted in general by reference number 40. Each of the rings 40 is formed by a pair of spaced, raised shoulders 42 and 44 which extend outward above the side wall of each tank on opposite sides of a central recess 46. The circular portions of the upper and lower mounting brackets 30 and 36 are brought into secure engagement with the central recess 46 of the annular ring 40 on the tank 20 to securely mount the tank 20 at one end to the vehicle 10 and, at the same time, prevent fore and aft movement of the tank 20 during operation of the vehicle or during a collision since the mounting brackets 30 and 32 are securely positioned between the raised shoulders 42 and 44 on the tank 20.

A similar upper and lower mounting bracket arrangement is provided for the tanks 22 and 24. In an exemplary arrangement, the tanks 22 and 24 are disposed in close side-to-side proximity to each other such that a single upper mounting bracket 50 and a single lower mounting bracket 52 are constructed to securely attach both tanks 22 and 24 to the vehicle 10. The upper mounting bracket 50 includes a pair of spaced, generally semicircular, concave portions 54 and 56 which conform to the shape of the tanks 22 and 24, respectively. Mounting legs are provided on the outboard portions of the upper mounting bracket 50 for mounting engagement to the cross member 16 of the vehicle 10. The lower mounting bracket 52 also includes a pair of spaced, generally concave portions 58 and 60 which engage the tanks 22 and 24 in the central recess 46 between the raised shoulders 42 and 44 of the annular ring 40 on the tanks 22 and 24.

A similar mounting means is also provided at a rear or opposed end of each of the tanks 20, 22 and 24. This provides two points of attachment for each of the tanks 20, 22 and 24 and provides a convenient mounting arrangement for the tanks as well as preventing the tanks 20, 22 and 24 from moving forward or rearward during operation of the vehicle or during a collision.

A fuel fill assembly is provided for supplying fuel to each of the tanks 20, 22 and 24. As shown in FIG. 2, the fuel fill assembly includes a fuel fill valve 62 mounted on the vehicle 10 in a fuel fill access opening 63. A fuel fill access door 64 is pivotally mounted on the vehicle 10 for movement between a first position closing the fuel fill opening 63 and a second position, shown in FIG. 2, exposing the fuel fill opening 63 and the fuel fill valve 62 to access. A switch 66 is mounted on the vehicle 10 to detect the open position of the fuel fill door 64. The switch 66 is connected to a control means, as described hereafter, to provide a signal indicating the open position of the fuel fill access door 64. This signal is employed by the control means to close the electric shut-off valve, described hereafter, in the fuel delivery conduit to prevent operation of the vehicle 10 during refueling operations.

A conduit or fuel line 70, typically of stainless steel, extends from the fuel fill valve 62 to a four-way connector 72 shown in FIG. 2. The connector 72 provides branch connections via separate conduits between the fuel fill conduit 70 and the valves 26 on each of the tanks 20, 22 and 24. Individual conduits 74, 76 and 78 extend from separate connections on the connector 72 to the valves 26 on each tank 20, 22 and 24. A fuel fill passage extends through the valves 26 via a one-way valve, not shown, in each valve 26 directly to each tank 20, 22 and 24 to allow refilling of each tank 20, 22 and 24.

The valves 26 are spring returned, normally closed, electrically controlled valves which, when the vehicle ignition is off, are closed, blocking the discharge of fuel from the tanks 20, 22 and 24. When the fuel fill door 63 is closed, as indicated by a signal from the switch 66, the control means will provide a signal to each of the valves 26 energizing the valves 26 to switch to an open position allowing the discharge of fuel from the tanks 20, 22 and 24.

Fuel delivery conduits 80, 82 and 84 extend from the outlet of each of the valves 26 on the tanks 20, 22 and 24 to a second four-way connector 86 shown in FIG. 2. A short fuel conduit 87 extends from one port of the connector 86 to a manually operated fuel shut-off valve 88 shown in FIG. 5. The shut-off valve 88 is a conventional manually operated valve which provides manual shut-off or opening of the fuel supply to the engine 9.

An outlet conduit 90 extends from the valve 88 to a fuel quantity sensor or transducer means 92. The fuel quantity sensor or transducer 92 is mounted by means of a bracket to side rail 12 of the vehicle 10. Any suitable fuel quantity sensor 92 may be employed which provides an output signal indicative of the pressure in the fuel supply or delivery conduit.

Figure 5:
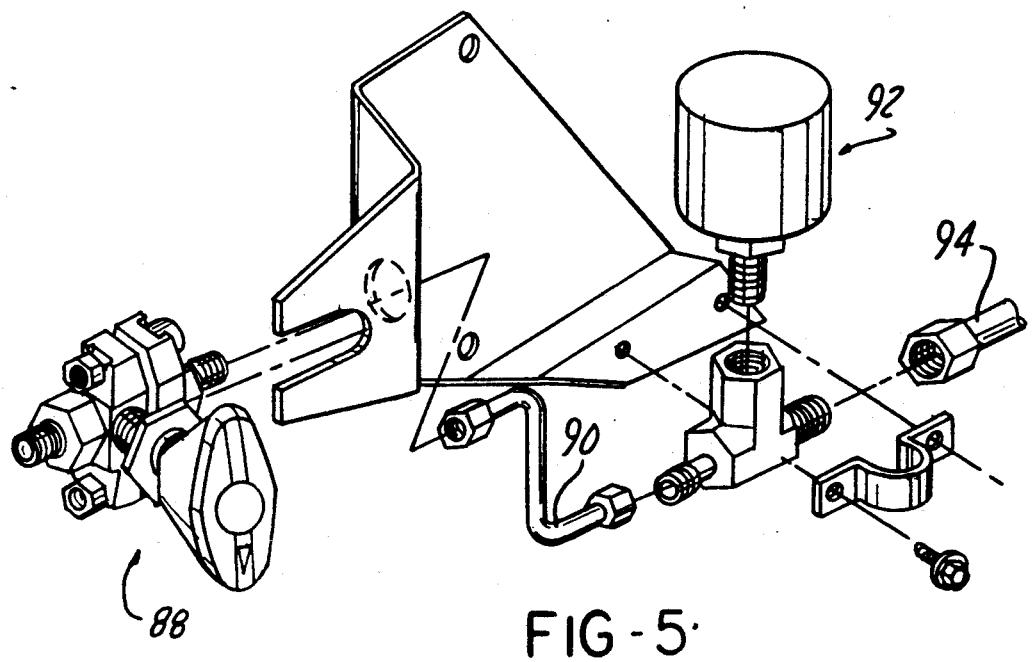
FIG. 5 is an exploded, perspective view showing the connection of a manual fuel shut-off valve and a fuel quantity transducer in the fuel delivery conduit connected to the fuel storage tanks.
Figure 6:
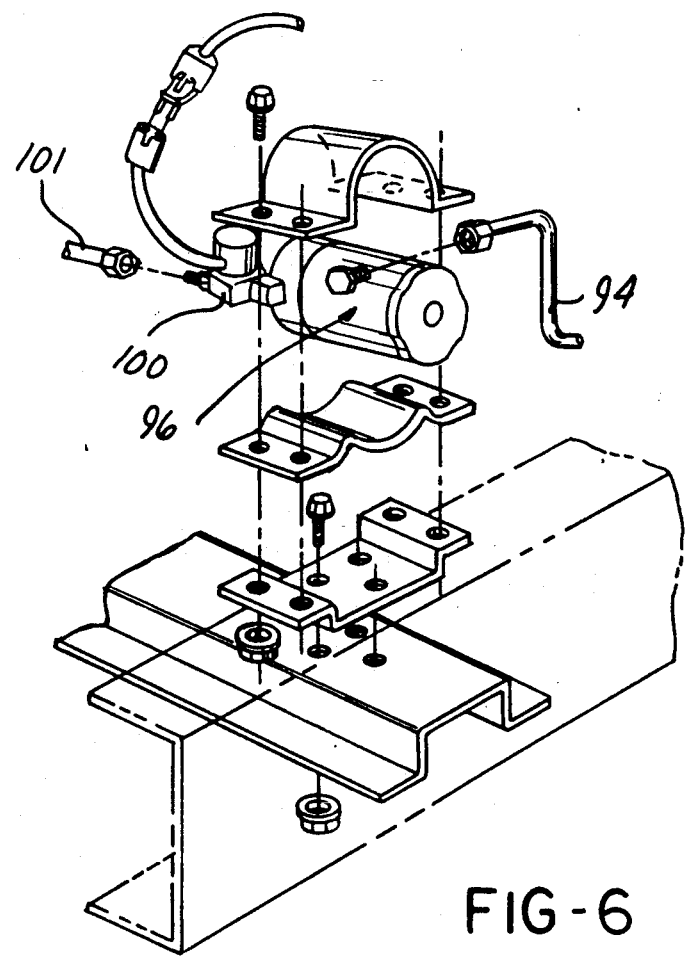
FIG. 6 is a perspective view of a pressure regulator connected in the fuel delivery conduit.

As shown in FIGS. 5 and 6, the fuel quantity sensor 92 is connected by a short fluid conduit 94 to a pressure regulator 96. The regulator 96 regulates the pressure of the fuel flowing from the tanks 20, 22 and 24 to the vehicle engine 9. By way of example only, the regulator 96 regulates the tank pressure from a maximum of 3,600 psi to a critical output pressure, such as 150 psi.

The outlet of the regulator 96 is connected to an electrically controlled fuel shut-off valve 100. The fuel shut-off valve 100 is a low pressure valve which is controlled by the control means which will switch the valve 100 to a closed position blocking fuel flow from the tanks 20, 22 and 24 to the engine 9 when the fuel filler door 64 is opened during refueling or when the vehicle ignition is off.

Figure 8:
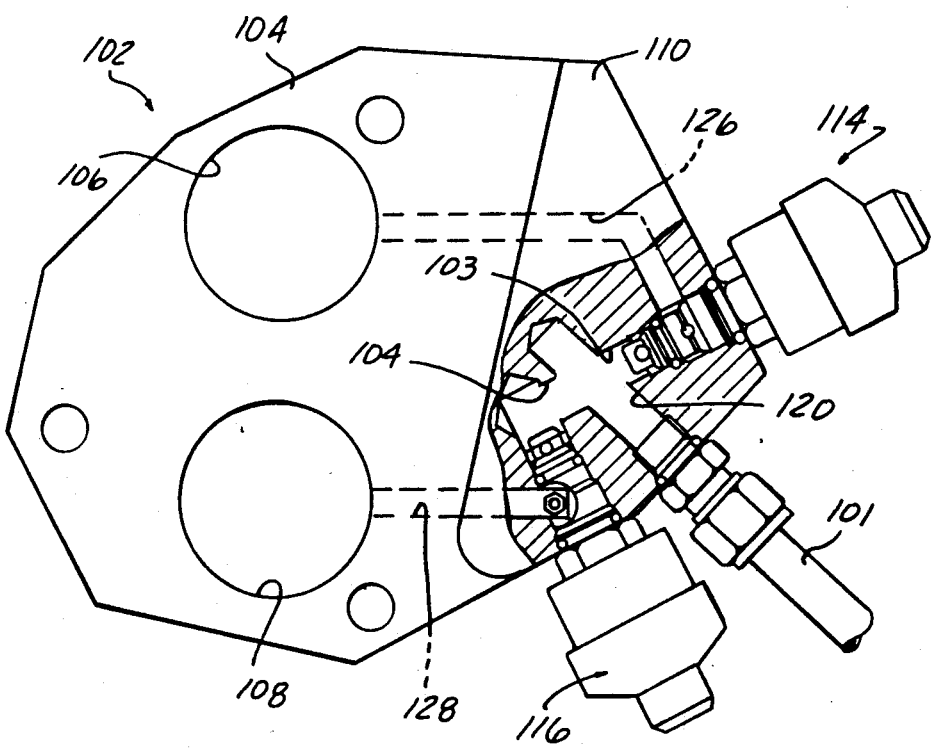
FIG. 8 is a plan view of the adapter plate shown in FIG. 7.
Figure 7:
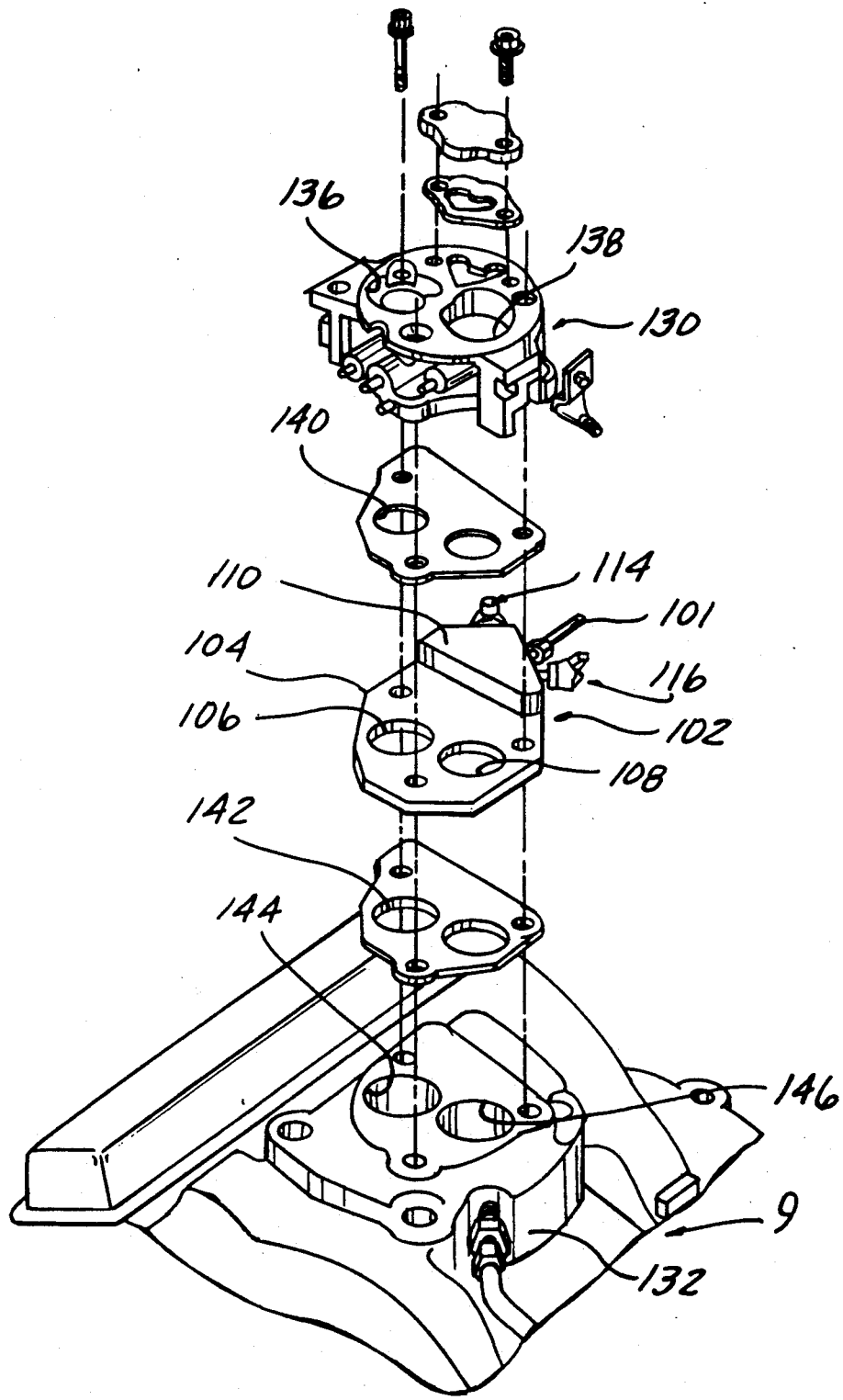
FIG. 7 is an exploded, perspective view showing the mounting of a throttle body and an adapter plate to the intake manifold of the engine shown in FIG. 1.

A conduit 101 connects the outlet of the fuel shut-off valve 100 in fluid flow communication with an adapter plate 102, shown in FIGS. 7 and 8. The adapter plate 102 is one embodiment of a means for mounting the fuel injector means below the throttle plate and for disposing the fuel injector means in fluid flow communication with the air passage extending between the throttle plate and the intake manifold of the engine 9. Other mounting means, such as integrally mounting the fuel injector means in a modified throttle body, with the fuel injector means disposed below the throttle plate, is also possible within the scope of the present invention.

The adapter plate 102 is in the form of a substantially planar plate 104 having at least one and preferably a pair of fluid flow bores 106 and 108 extending therethrough. An enlarged block portion 110 formed at one end of the plate 104 is provided with at least one and preferably a pair of bores, each of which receive an individual fuel injector, such as fuel injectors 114 and 116.

The conduit 101 is connected by suitable fittings to a bore 120 in the block 110 of the adapter plate 102. The bore 120 communicates with a pair of transverse bores 103 and 104 which extend to the bores in which the fuel injectors 114 and 116 are mounted to provide fluid flow paths from the conduit 101 to the inlets of the fuel injectors 114 and 116. The outlet of each fuel injector 114 and 116 is respectively connected to individual bores 126 and 128 which extend through the block 110 and the plate 104 and respectively open into the fluid flow bores 106 and 108 in the plate 104.

As shown in FIG. 7, the adapter plate 102 is mounted below a throttle body 130 and above the air intake manifold 132 of the engine 9 of the vehicle 10. Alternately, the plate 102 could be integrally formed as part of the throttle body 130.

The throttle body 130 is of conventional construction and includes a housing having at least one and preferably a pair of spaced air flow passages 136 and 138 extending therethrough. A pivotal throttle plate, not shown, is mounted in each of the bores 136 and 138 to provide selective flow of air in predetermined quantities through the bores 136 and 138 in response to movement of the vehicle accelerator pedal which is transmitted through a suitable linkage through the throttle plates. A throttle plate position sensor, not shown, may be mounted on the throttle body 130 for providing throttle plate position information. Gaskets 140 and 142 are disposed on opposite sides of the plate portion 104 of the adapter plate 102. As shown in FIG. 7, the throttle body 130, the gaskets 140 and 142 and the adapter plate 102 are attached by bolts to the upper portion of the air intake manifold 132 such that the air flow passages 136 and 138 in the throttle body 130 communicate with the corresponding bores 106 and 108 in the adapter plate 102 and the inlet bores 144 and 146 in the air intake manifold 132.

As shown in FIG. 8, each of the injectors 114 and 116 is identically constructed such that the following description will be provided only for the fuel injector 114. The fuel injector 114 is of conventional construction, such as a gaseous fuel injector manufactured by Servo Jet International, San Diego, California, Model No. HSV3000.

Figure 9:
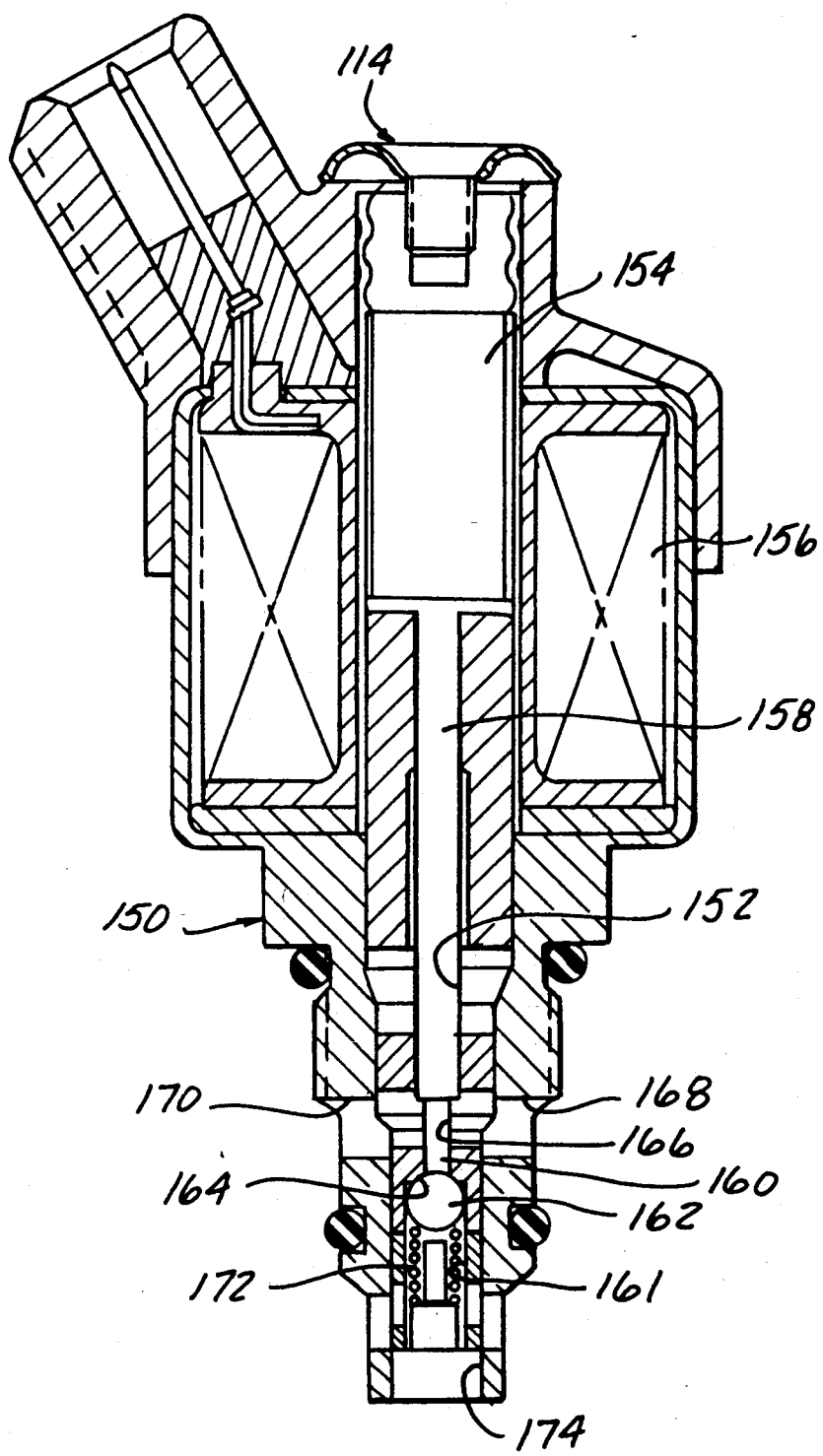
FIG. 9 is a cross sectional view of a fuel injector shown in FIGS. 7 and 8.

As shown in FIG. 9, the fuel injector 114 includes a housing 150 having an axial bore 152 extending therethrough. A solenoid formed of a plunger 154 and a coil 156 is mounted in the housing 150 with a rod 158 extending from one end of the plunger 154 through the bore 152. The end 160 of the plunger rod 158 engages a ball 162 mounted in a fuel passage 161 at one end of the housing 150 of the fuel injector 114.

The ball 162 normally seats in a valve seat 164 formed in the chamber 161 to close a fuel flow passage 166 extending from the passage 161 to a pair of oppositely directed outlet passages 168 and 170 which open outward from the housing 150 of the fuel injector 114. The ball 162 is normally biased to the closed position in engagement with the seat 164 by a biasing means 172, such as a coil spring. An inlet opening 174 is formed at one end of the housing 150 and communicates with the passage 161 surrounding the ball 162 and biasing spring 174.

In normal operation, with electrical current to the coil 156 disconnected, the plunger 154 will be in the retracted position shown in FIG. 9 with the ball 162 closing the fuel flow passage 166 and blocking fuel flow from the inlet 174 to the outlets 168 and 170. As described hereafter, the control means will supply 15 electrical current to the coil 156 thereby causing the plunger 154 to move and overcome the biasing force of the spring 172 and force the ball 162 away from the seat 160. This opens the fuel flow passage 166 to the flow of fuel from the inlet 174 through the passage 161 and then to the outlets 168 and 170 whereby the fuel flows from the injector 114 to the bore 106 in the adapter plate 102 and then to the intake manifold 132 with the air/fuel ratio determined by the control means which controls the amount of open time of the fuel injector 114.

Figure 10:
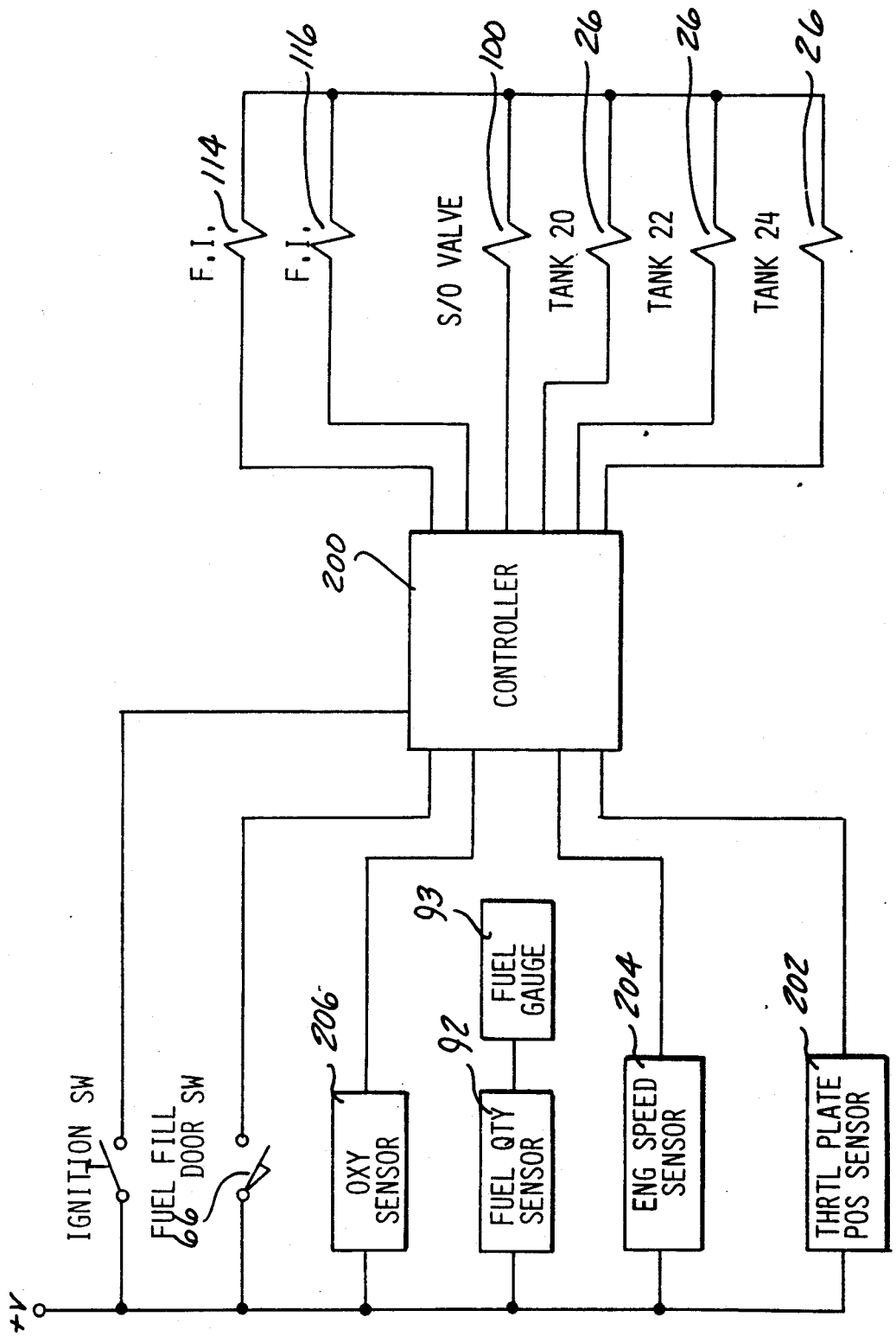
FIG. 10 is a block diagram of the control means used to control the fuel injection apparatus of the present invention.

The control means supplies pulse width modulated signals to the coil 156 of the fuel injector 114 to control the amount of injector open time. As shown in FIG. 10, the control means 200 provides signals in a conventional manner to the fuel injectors 114 and 116 to control the amount of fuel injected into the engine 9. The control means 200 may be any suitable electronic controller, such as a microprocessor executing a stored control program. The control means 200 may be a stand-alone controller dedicated specifically to the fuel injection apparatus or it may be incorporated into the standard vehicle computer found on current automotive vehicles.

The control means 200 executes a stored control program to provide a desired air/fuel ratio dependent upon throttle plate position and engine speed, as sensed by conventional throttle plate position sensor means and engine speed sensor means 202 and 204, respectively. As the generation of pulse width modulated signals to control the amount of open time of fuel injector valves is well known and is not a part of the present invention, further details concerning the generation of such signals will not be provided herein.

As shown in FIG. 10, the fuel quantity sensor 92 supplies fuel quantity signals to a conventional fuel gauge 93 mounted in the vehicle 10. The control means 200 receives the output from the fuel fill door switch 66 as described above. The control means 200 executes a stored control program to control the energization of the shut-off valve 100 when the vehicle ignition is off and, also, when the fuel fill door 63 is in an open position. In addition, the control means 200 de-energizes the tank valves 26 thereby preventing the discharge of fuel from the tanks 20, 22 and 24 when the vehicle ignition is off and/or the fuel fill door 63 is open. The control means 200 will switch the shut-off valve 100 to the open fuel flow position as well as energizing the tank valves 26 to open positions allowing the discharge of fuel from the tanks 20, 22 and 24 only when the vehicle ignition is on and the fuel fill door 63 is closed.

Another feature of the present invention is a closed loop, continuous fuel monitoring system. In this embodiment, the control means 200 continuously monitors the output of an oxygen sensor 206 mounted in the exhaust gas pipe of the vehicle 10. The oxygen sensor 206, which may be any conventional type of oxygen sensor, senses the amount of oxygen in the engine exhaust which is determinative of the actual engine air/fuel ratio. The output signal from the oxygen sensor 206 is input to the control means 200 which will vary the amount of fuel injected into the engine 9 by controlling the amount of fuel injector "on" time to bring the air/fuel ratio to the desired amount thereby continuously adapting the fuel injection apparatus to variations in engine operating and environmental conditions.

In summary, there has been disclosed a unique fuel injection apparatus for injecting gaseous fuels into an intake manifold of an engine. The fuel injection apparatus uniquely mounts the fuel injectors below the throttle plate in a throttle body thereby reducing noise levels generated by sonic fuel flow through fuel injectors to lower, acceptable levels. The fuel injection apparatus of the present invention also includes a unique tank mounting means which securely mounts the high pressure gaseous fuel tanks to the vehicle in a convenient location below the vehicle cargo or passenger compartment. The fuel injection apparatus of the present invention also includes a unique fuel shut-off device to close the fuel flow during the refueling operations. The fuel injection apparatus also provides continuous, closed loop fuel monitoring to enable the air/fuel ratio to be continuously maintained at a desired amount regardless of variations in engine operating and environmental conditions.

What is claimed is:

1. A throttle body fuel injection apparatus for injecting gaseous fuel into an intake manifold of an engine comprising:

a throttle body having at least one air flow passage extending therethrough in fluid flow communication with an intake manifold and a movable throttle plate mounted in the air flow passage for varying the quantity of air flow through the air flow passage;

cyclically operable fuel injection means;

means for mounting the fuel injection means between the throttle plate and an intake manifold of an engine in fluid flow communication with the air flow passage extending through the throttle body to the intake manifold for reducing noise; and control means, including throttle position sensing means and engine speed sensing means, for cyclically actuating the fuel injection means to inject fuel in pulses of timed durations and cyclic frequencies variable in response to variations in throttle position and engine speed, respectively, sensed by the throttle position sensing means and the engine speed sensing means, for establishing air to fuel mixture ratios.

2. The throttle body fuel injection apparatus of claim 1 wherein the fuel injector means comprises:

a solenoid actuated injector valve having a fuel inlet, an internal fuel flow passage disposed in fluid communication with the inlet, a fuel discharge passage extending from the fuel flow passage, and a normally closed valve operable when closed to block fluid communication between the fluid flow passage and the discharge passage and operable upon actuation of the solenoid to open to accommodate the discharge of fuel from the inlet and through the fluid flow passage through the fuel discharge passage.

3. The throttle body fuel injection apparatus of claim 1 further comprising:

two spaced air flow passages are formed in the throttle body; and two fuel injector means;

the mounting means mounting each of the fuel injector means in fluid flow communication with one of the air flow passages extending through the throttle body and the intake manifold.

4. A throttle body fuel injection apparatus for injecting gaseous fuel into an intake manifold of an engine comprising:

a throttle body having at least one air flow passage extending therethrough in fluid flow communication with an intake manifold and a movable throttle plate mounted in the air flow passage for varying the quantity of air flow through the air flow passage;

cyclically operable fuel injection means, the fuel injection means including:

a solenoid actuated injector valve having a fuel inlet, an internal fuel flow passage disposed in fluid communication with the inlet, a fuel discharge passage extending from the fuel flow passage, and a normally closed valve operable when closed to block fluid communication between the fluid flow passage and the discharge passage and operable upon actuation of the solenoid to open to accommodate the discharge of fuel from the inlet and through the fluid flow passage through the fuel discharge passage;

means for mounting the fuel injection means between the throttle plate and an intake manifold of an engine in fluid flow communication with the air flow passage extending through the throttle body to the intake manifold, the mounting means including:

an adapter plate mounted between the throttle body and the intake manifold, the adapter plate having at least one bore extending therethrough in fluid flow communication with the air flow passage between the throttle body and the intake manifold;

the fuel injection means mounted in the adapter plate;

fluid flow means formed in the adapter plate for connecting the inlet of the fuel injector valve to a source of gaseous fuel and the fuel discharge passage of the fuel injector valve to the bore in the adapter plate to provide fuel flow from the fuel injector valve to the air flow passage between the throttle body and the intake manifold; and control means, including throttle position sensing means and engine speed sensing means, for cyclically actuating the fuel injection means to inject fuel in pulses of timed durations and cyclic frequencies variable in response to variations in throttle position and engine speed respectively sensed by the throttle position sensing means and the engine speed sensing means for establishing air to fuel mixture ratios.

5. The throttle body fuel injection apparatus of claim 4 further comprising:

a fuel inlet formed in the adapter plate; and a fluid flow passage formed in the adapter plate and extending from the fuel inlet to fluid communication with the fuel inlet of the fuel injector valve;

the fuel discharge passage of the fuel injector valve disposed in fluid flow communication with a second fluid flow passage in the adapter plate, the second fluid flow passage extending to fluid communication with the bore in the adapter plate.

6. The fuel injection apparatus of claim 1 further comprising:

sensor means mounted in the exhaust pipe of a vehicle for sensing the air/fuel ratio of exhaust gases, the sensor means connected to the control means; and the control means continuously varying the air/fuel ratio on a full time basis at any position of the throttle plate by controlling the energization of the fuel injector means in response to variations in the air/fuel ratio detected by the sensor means.

7. A fuel injection apparatus for injecting gaseous fuel into an intake manifold of an engine comprising:

a throttle body having at least one air flow passage extending therethrough in fluid flow communication with an intake manifold and a movable throttle plate mounted in the air flow passage for varying the quantity of air flow through the air flow passage;

cyclically operable fuel injection means;

means for mounting the fuel injection means between the throttle plate and an intake manifold of an engine in fluid flow communication with the air flow passage extending through the throttle body to the intake manifold;

control means, including throttle position sensing means and engine speed sensing means, for cyclically actuating the fuel injection means to inject fuel in pulses of timed durations and cyclic frequencies variable in response to variations in throttle position and engine speed, respectively, sensed by the throttle position sensing means and the engine speed sensing means, for establishing air to fuel mixture ratios;

tank means for storing gaseous fuel under high pressure;

means for mounting the tank means on the vehicle, the mounting means including:
- an annular recess formed in the side wall of the tank means, spaced from one end of the tank means;
- first and second raised, annular shoulders disposed on opposite sides of the recess and extending outward above the side wall of the tank means; and
- bracket means engageable with the recess in the tank means and attachable to the vehicle; and conduit means connecting the tank means and the fuel injection means in fluid flow communication.

8. The fuel injection apparatus of claim 7 wherein the bracket means comprises:
- a first bracket attachable to the vehicle, the first bracket having a semicircular recess formed therein for engagement with a portion of the side wall in the recess of the tank means; and
- a second bracket having a semicircular portion engageable with the recess in the side wall of the tank means, the second bracket attachable to the first bracket to mount the tank means to the vehicle.

9. The fuel injection apparatus of claim 7 further comprising:
- an electrically controllable solenoid valve, controlled by the control means, mounted on one end of the tank means, the valve having inlet and outlet ports;
- a fuel fill valve;
- fluid flow fuel fill conduits extending from the fuel fill valve to the inlet port of the valve mounted on the tank means; and
- fluid flow delivery conduits extending from the valve means on the tank means to the fuel injector means.

10. The fuel injection apparatus of claim 9 further comprising:
- pressure regulator means disposed in fluid flow communication with the fuel delivery conduits for regulating the pressure of fuel flowing from the tank means to the fuel injector means to a predetermined pressure; and
- an electrically operable shut-off valve, disposed in fluid flow communication with the fuel delivery conduits for selectively enabling and blocking the flow of fuel from the tank means to the fuel injector means under control of the control means.

11. The fuel injection apparatus of claim 10 further comprising:
- a fuel fill door mounted on the vehicle and movable between a first position covering the fuel fill valve and a second position exposing the fuel fill valve to access;
- switch means, mounted on the vehicle, for sensing the fuel fill door being positioned away from the first position, the switch means connected to the control means; and
- the control means switching the shut-off valve to the blocking position when the fuel fill door is positioned away from the first position.

12. The throttle body fuel injection apparatus of claim 7 wherein the tank means comprises:
- at least one tank having a cylindrical shape with a side wall.

13. The throttle body fuel injection apparatus of claim 7 further comprising:
- two spaced annular recesses formed in the side wall of the tank means, each having first and second spaced annular shoulders disposed on opposite sides thereof and extending above the side wall of the tank means;
- the bracket means being mountable in each recess for mounting the tank means to a vehicle.

14. A throttle body fuel injection apparatus for injecting gaseous fuel into an intake manifold of an engine comprising:
- a throttle body having two spaced air flow passages extending therethrough in fluid communication with an intake manifold of an engine, a movable throttle plate mounted in each air flow passage for varying the quantity of air flow through each passage;
- cyclicly operable fuel injection means for injecting pulses of fuel into each air flow passage;
- an adapter plate mountable between the throttle plate and the intake manifold, the adapter plate having two spaced bores extending therethrough, each disposed in fluid flow communication with one of the air flow passages extending through the throttle body to the intake manifold, a fuel inlet formed in the adapter plate;
- the fuel injector means mounted in the adapter plate;
- fluid flow passages formed in the adapter plate and extending from the fuel inlet to fluid communication with the fuel injector means;
- second fluid flow passages formed in the adapter plate for disposing the fuel injector means in fluid flow communication with the bores in the adapter plate to inject fuel from the fuel injector means into the bores and the air flow passages between the throttle body and the intake manifold; and
- control means, including throttle position sensing means and engine speed sensing means, for cyclically actuating the fuel injection means to inject fuel in pulses of timed durations and cyclic frequencies variable in response to variations in throttle position and engine speed, respectively, sensed by the throttle position sensing means and the engine speed sensing means for establishing air to fuel mixture ratios.

* * * * *